United States Patent

Wilbur et al.

[11] Patent Number: 5,267,637
[45] Date of Patent: Dec. 7, 1993

[54] ACTUATOR WITH ANTI-ROTATION SPRING

[75] Inventors: Darrin F. Wilbur, Smiths Creek; Paul M. Regula, Sterling Heights, both of Mich.

[73] Assignee: Automotive Products plc, Warwickshire, England

[21] Appl. No.: 929,990

[22] Filed: Aug. 17, 1992

[51] Int. Cl.⁵ .............................................. F16D 25/08
[52] U.S. Cl. ............................. 192/85 CA; 192/91 A; 92/130 R
[58] Field of Search ................... 192/85 CA, 91 A, 98; 92/130 R, 165 PR

[56] References Cited

U.S. PATENT DOCUMENTS

| | | | |
|---|---|---|---|
| 4,526,259 | 7/1985 | Brandenstein et al. | 192/91 A |
| 4,560,051 | 12/1985 | Brandenstein et al. | 192/98 |
| 4,561,531 | 12/1985 | Young et al. | 192/85 CA |
| 4,585,106 | 4/1986 | Shirley | 192/85 CA |
| 4,620,625 | 11/1986 | Ladin | 192/85 CA |
| 4,915,202 | 4/1990 | Leigh-Monstevens et al. | 192/85 CA |
| 4,938,332 | 7/1990 | Thomas et al. | 192/85 CA |
| 4,949,827 | 8/1990 | Leigh-Monstevens et al. | 192/85 CA |

Primary Examiner—Richard M. Lorence
Attorney, Agent, or Firm—Krass & Young

[57] ABSTRACT

A concentric hydraulic clutch actuator including a coil spring arranged to be stressed in response to expansion and contraction of the actuator and including end portions which are bent radially inwardly and coact with circumferentially spaced lugs on the cylinder and on the piston to preclude relative rotation between the piston and cylinder in either direction of relative rotation. Relative rotation in one direction is inhibited by contact of the bent portion with one of the lugs and relative rotation in the other direction is inhibited by abutting engagement of the end face of the bent portions with respective lugs.

15 Claims, 3 Drawing Sheets

ACTUATOR WITH ANTI-ROTATION SPRING

BACKGROUND OF THE INVENTION

This invention relates to actuators and more particularly to hydraulic actuators to facilitate the engagement and disengagement of a motor vehicle clutch.

Hydraulic clutch actuators may comprise either a slave cylinder positioned externally of the clutch housing and operating the clutch release bearing through a lever mechanism extending through the clutch housing or a concentric actuator wherein the actuator is positioned concentrically around the clutch shaft of the vehicle and includes an annular piston connected to the release bearing of the clutch assembly so that sliding movement of the annular piston in the annular pressure chamber of the cylinder operates in known manner to engage and disengage the clutch of the vehicle Since a rotational force is imparted to the piston through the clutch release bearing from the engine drive shaft it is important that means be provided to inhibit this rotation. This rotation can be inhibited for example by key connections between the piston and the cylinder or by the provision of separate locking members engaging the cylinder and piston. However, these arrangements add to the complexity and expense of the actuator since they require additional parts and additional machining. An arrangement is proposed in U.S. Pat. No. 4,526,259 which utilizes the existing coil spring arranged between the piston and the cylinder housing as an antirotation means. However, the arrangement of U.S. Pat. No. 4,526,259 preludes rotation of the piston and cylinder only in one relative direction (for example the direction induced by the rotation of the engine) but is ineffective to preclude relative rotation between the piston and the cylinder in the opposite direction.

SUMMARY OF THE INVENTION

This invention is directed to the provision of an improved actuator.

More specifically, this invention is directed to the provision of an improved hydraulic clutch actuator in which an existing coil spring is utilized to inhibit relative rotation between the piston and cylinder in both directions.

The invention actuator comprises a cylinder member defining a bore having a central axis, a piston member mounted for axial movement in the bore and a spring, comprising a plurality of axially successive interconnected generally circular coils, positioned in concentric surrounding relation to the central axis and arranged to be stressed in response to relative axial movement between the cylinder member and the piston member.

According to the invention, the free end portion of at least one of the end coils of the spring is bend radially in one direction with respect to the general circle defining the remainder of the end coil and means are provided to bias the free end portion in a radially opposite direction in response to relative rotation between the cylinder member and the piston member in one direction. This arrangement provides a simple and effective means of impeding relative rotation between the cylinder member and piston member in one direction.

According to a further feature of the invention, the biasing means comprises means defining a support surface for the end coil and including an interruption in the support surface to accommodate the bent end portion. This arrangement provides an efficient means of radially biasing the free end portion in response to relative rotation between the cylinder member and the piston member.

According to a further feature of the invention, the interruption includes a stop face arranged to engage an end face of the spring free end portion in response to relative rotation between the cylinder member and the piston member in the opposite direction. With this arrangement, relative rotation between the cylinder member and the piston member in one direction is precluded by radial biasing of the free end spring portion and relative rotation between the cylinder and piston in the opposite direction is precluded by abutting engagement of the end face of the spring end portion with a stop face.

According to a further feature of the invention, the support surfaces are defined by a series of circumferentially spaced lugs on one of the members with the end coil engaging at least some of the lugs, the interruption is defined between one lug and the next successive lug, the stop face is defined by a side face of the one lug, and the bent end portion is positioned in the interruption so that relative rotation of the cylinder member and the piston member in one direction brings the bent portion into engagement with the next lug to impede further relative rotation and relative rotation between the cylinder member and piston member in the opposite direction moves the end face of the spring end portion into engagement with the side face of the one lug.

According to a further feature of the invention, the end coil is wrapped around at least some of the lugs and the free end portion is bent radially inwardly and biased radially outwardly in response to engagement with the next lug upon relative rotation between the cylinder member and the piston member.

According to a further feature of the invention, the free end portion of both end coils of the spring are bent radially inwardly, a series of circumferentially spaced lugs are provided on the cylinder member and on the piston member, one end coil of the spring is wrapped around at least some of the piston member lugs with its bent end portion positioned between successive piston member lugs and the other end coil of the spring is wrapped around at least some of the cylinder member lugs with its bent end portion positioned between successive cylinder member lugs.

In the disclosed embodiment of the invention, the cylinder member defines an annular bore and includes a radially outwardly extending flange portion, the piston member is an annular piston slidably received in the annular bore and including a free end projecting out of the annular bore and a radially outwardly extending flange portion proximate the free end confronting the cylinder member flange portion, and the lugs are provided on the flange portions.

DETAILED DESCRIPTION OF THE PREFERRED EMBODIMENT

Figure 1:
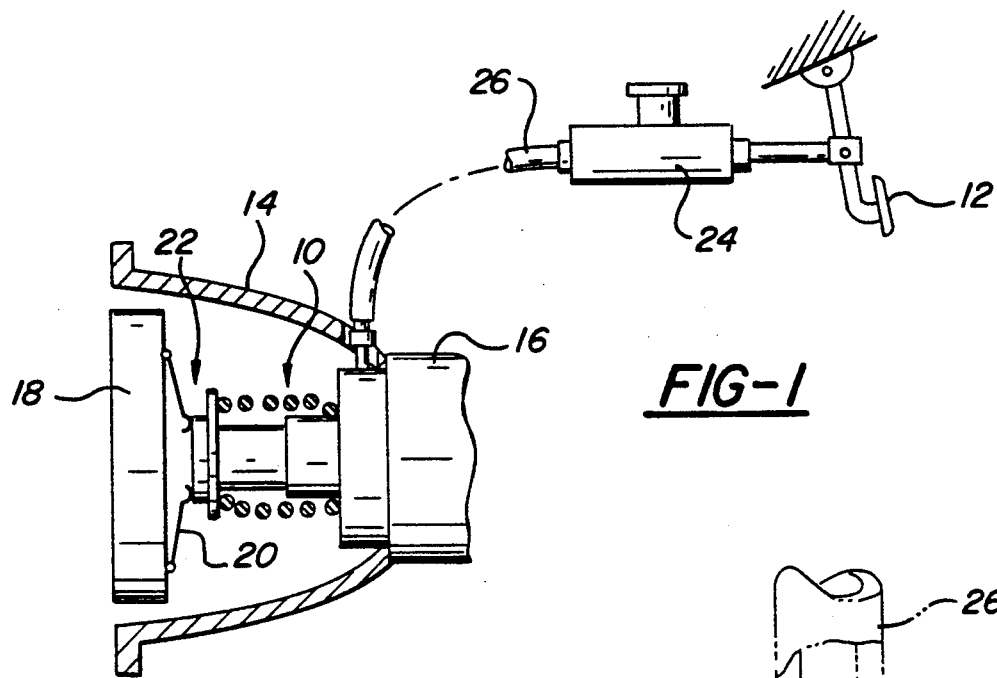
FIG. 1 is a schematic fragmentary view of a motor vehicle clutch assembly embodying the invention actuator.
Figure 3:
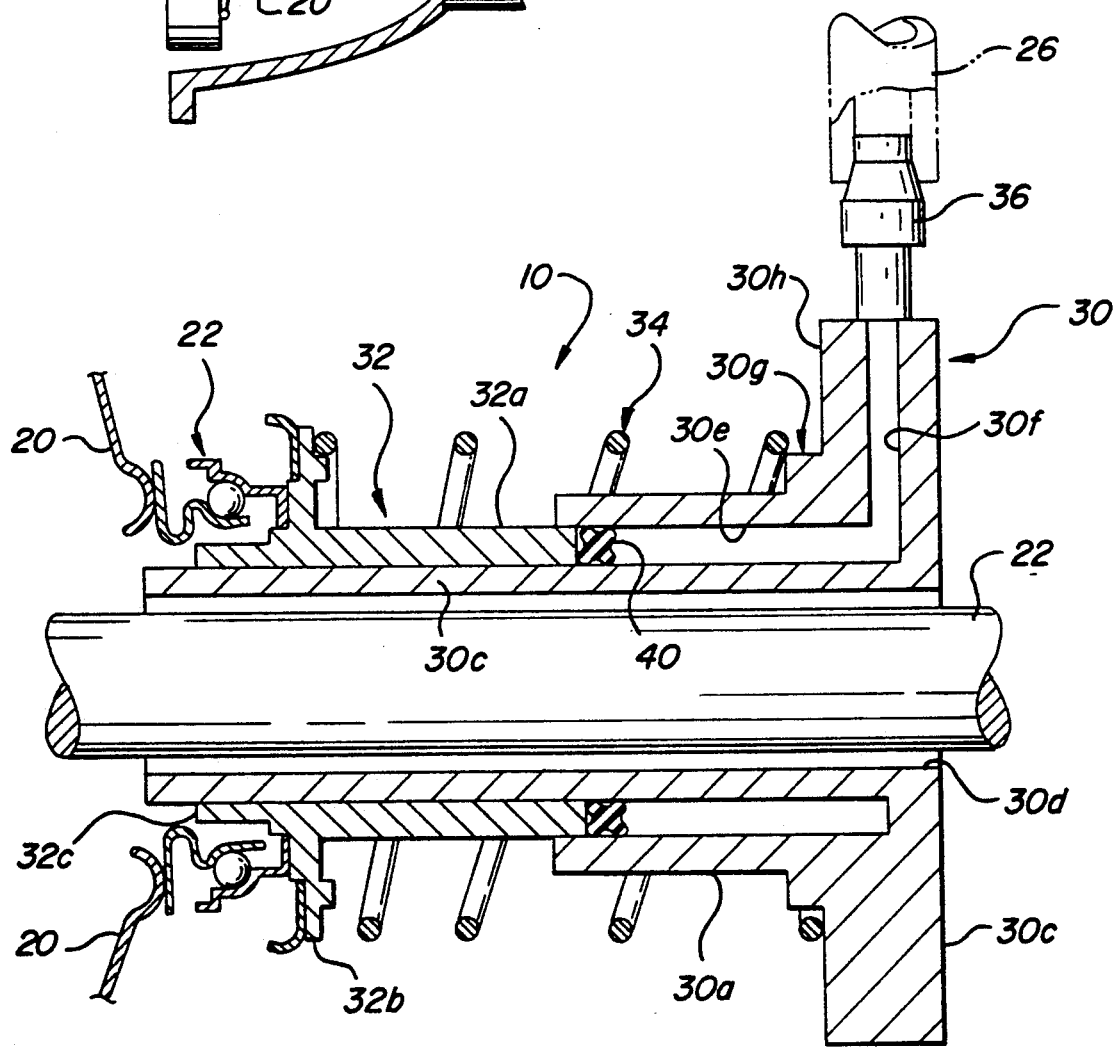
FIG. 3 is a longitudinal cross-sectional view of the invention actuator.
Figure 2:
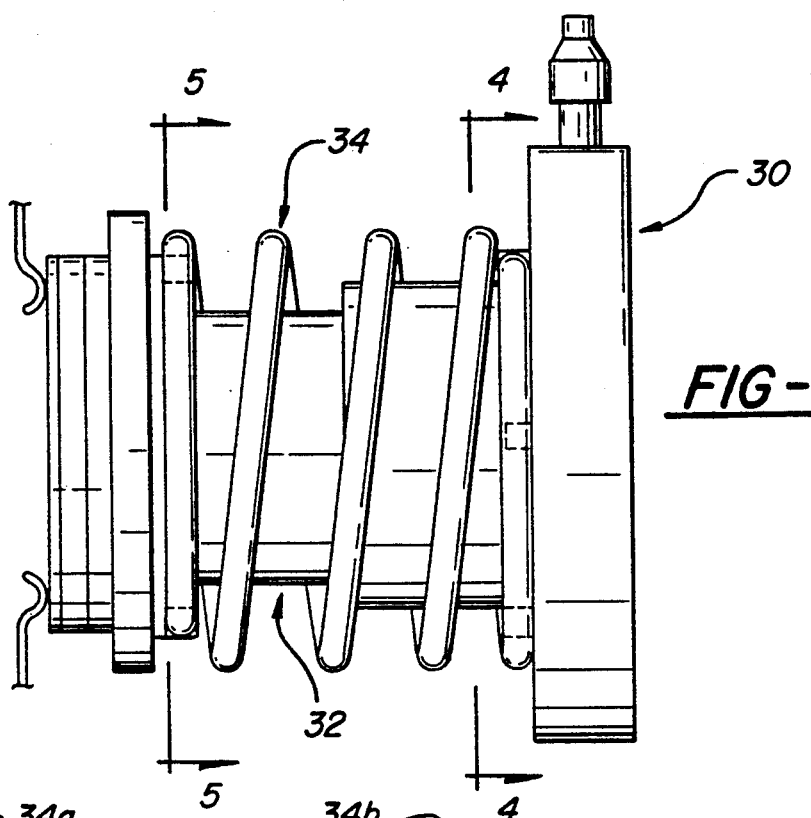
FIG. 2 is a side view of the invention actuator.
Figure 6:
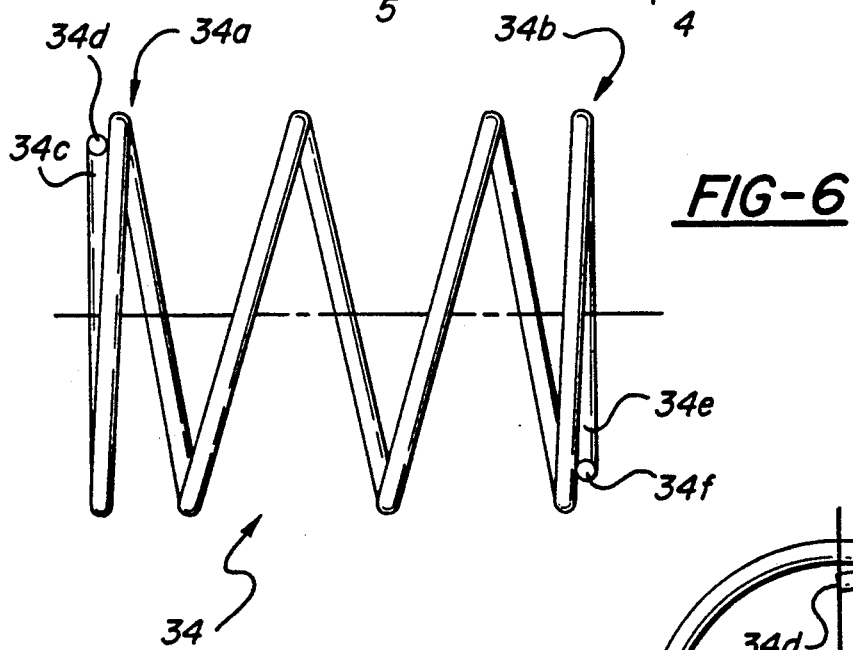
FIGS. 6 and 7 are side and end views, respectively, of a spring utilized in the invention actuator.
Figure 7:
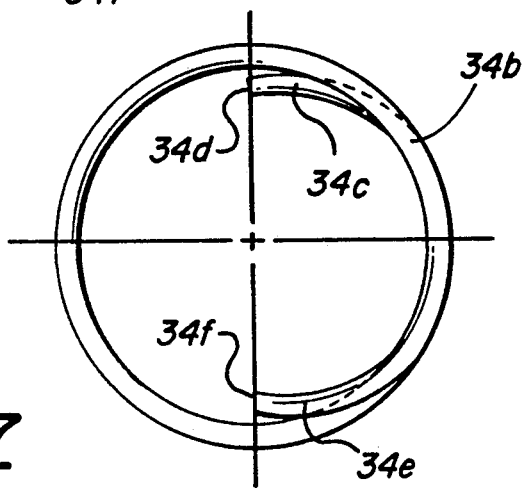

The invention actuator 10 is seen in FIG. 1 in association with a motor vehicle including a clutch pedal 12, a clutch bell housing 14 secured at its forward end to an engine (not shown) and at its rearward end to a gear box or transmission 16, and a clutch assembly 18 including diaphragm spring fingers 20 engaging a clutch release bearing 22. The actuator 10 is of the annular or concentric type and is secured to the front face 16a of the gear box 16 and extends forwardly therefrom in surrounding relation to the clutch shaft 22 interconnecting the clutch and the gear box. It will be understood that depression of the clutch pedal 12 actuates a master cylinder 24 which transmits hydraulic fluid through a conduit 26 to actuator 10 to move the release bearing 22 forwardly as viewed in FIG. 1 against the bias of the diaphragm fingers 20 to disengage the clutch in known manner. Actuator 10 includes a cylinder 30, a piston 32 and a spring 34.

Cylinder 30 includes a cylindrical main body portion 30a, a cylindrical quill shaft portion 30b, and a circular flange portion 30c. A central bore 30d extends through the cylinder to accommodate clutch shaft 22, an annular bore 30e is defined in cylindrical main body portion 30a in surrounding relation to central bore 30d, and a radial bore 30f in flange portion 30c communicates at its inner end with bore 30e and at its outer end with a fitting 36 for connection to conduit 26 so that hydraulic fluid may be supplied to conduit 26 and through radial bore 30f to cylinder bore 30e upon depression of clutch pedal 12. A plurality of circumferentially spaced lugs 30g are provided on the front annular face 30h of flange portion 30c. For example, four lugs 30g may be provided spaced at 90° intervals. Each lug 30g has a rectangular configuration and includes a radially inner face 30i, a radially outer face 30j, and side faces 30k and 30l.

Piston 32 includes a main body annular cylindrical portion 32a, a flange portion 32b, and a bearing carrier portion 32c.

Main body portion 32a is sized to fit slidably over quill shaft portion 30b of the cylinder and is sized to fit slidably in the cylinder bore 30e so that the piston will move forwardly and rearwardly along quill shaft portion 30c in response to the introduction of hydraulic fluid through passage 30f and into bore 30e. An annular elastomeric seal 40 coacts with the rear end of the piston 10 and with cylinder bore 30e to preclude hydraulic fluid leakage.

Flange portion 32b extends radially outwardly from main body portion 32a proximate the free or forward end of the piston and includes a plurality of circumferentially spaced lugs 32d on the rear face 32e of flange portion 32b. Each lug 32d has a generally rectangular configuration and includes a radially inner face 32f, a radially outer face 32g, and side faces 32h and 32i. Radially outer faces 32g lie on a circle having the same diameter as the circle on which the radially outer faces 30j lie so that the lugs 32b are positioned in directly confronting relation to lugs 30g. For example, six lugs 32d may be provided with the lug spaced 60° apart.

Bearing carrier portion 32c is positioned forwardly of flange portion 32b and in sliding engagement with quill shaft portion 30b and mounts the release bearing 22 for coaction with the diaphragm spring fingers 20 to engage and disengage the clutch in response to forward and rearward movement of the piston 32.

Spring 34 comprises a coil spring comprising a plurality of axially successive interconnected generally circular coils including a rear end coil 34a proximate cylinder flange portion 30c and a front end coil 34b proximate piston flange portion 32b. Spring 34 has an inner diameter approximating the diameter of the circle on which the radially outer faces of lugs 30g and 30d lie.

The free end portion 34c of end coil 34a is bent radially inwardly with respect to the general circle defining the remainder of the end coil to the extent that the end face 34d of the radially inwardly bent portion 34c is radially aligned with the lugs 30g and so that, specifically, the end face 34d is positioned in directly confronting relation to the side face 30l of the lug 30g with the remainder of the end coil 34a wrapped around successive lugs 30g so that the radially outer faces 30j of the successive lugs coact to define an arcuate support surface for the end coil with the inwardly bent end portion 34c disposed in an interruption in the support surface defined between successive lugs. For example, with the actuator in a relaxed configuration, end face 34d of bent portion 34c may be disposed approximately 10° from the confronting side face 30l of the lug 30g positioned at twelve o'clock on the cylinder flange portion.

Similarly, the free end portion 34e of end coil 34b is bent radially inwardly with respect to the general circle defining the remainder of the end coil so that the end face 34f of the bent end portion is radially aligned with the lugs 32d and so that, specifically, the end face 34f is in directly confronting relation to the side face 32h of one of the lugs 32d with the remainder of the end coil wrapped around successive lugs 32d so that the radially outer surfaces 32g of the lugs coact to define an arcuate support surface for the end coil with the bent portion 34e disposed in an interruption defined between successive lugs 32d. For example, with the actuator in a relaxed configuration, end face 34f may be disposed approximately 10° from the side face 32h of the lug 32d positioned at six o'clock on the piston flange portion. Although the spring 34 is shown as comprising a series of coils having a substantially uniform diameter, the spring may obviously have a spiral configuration in which each successive coil is successively smaller or larger and each of the coils of such a spirally configured spring is considered to be defined by a general circle.

In use, spring 34 compresses and expands in response to forward and rearward movement of piston 32 as the clutch is engaged and disengaged and further coacts with the lugs on the cylinder and on the piston to inhibit relative rotation between the piston and the cylinder in either direction of relative rotation as between the piston and cylinder.

Figure 4:
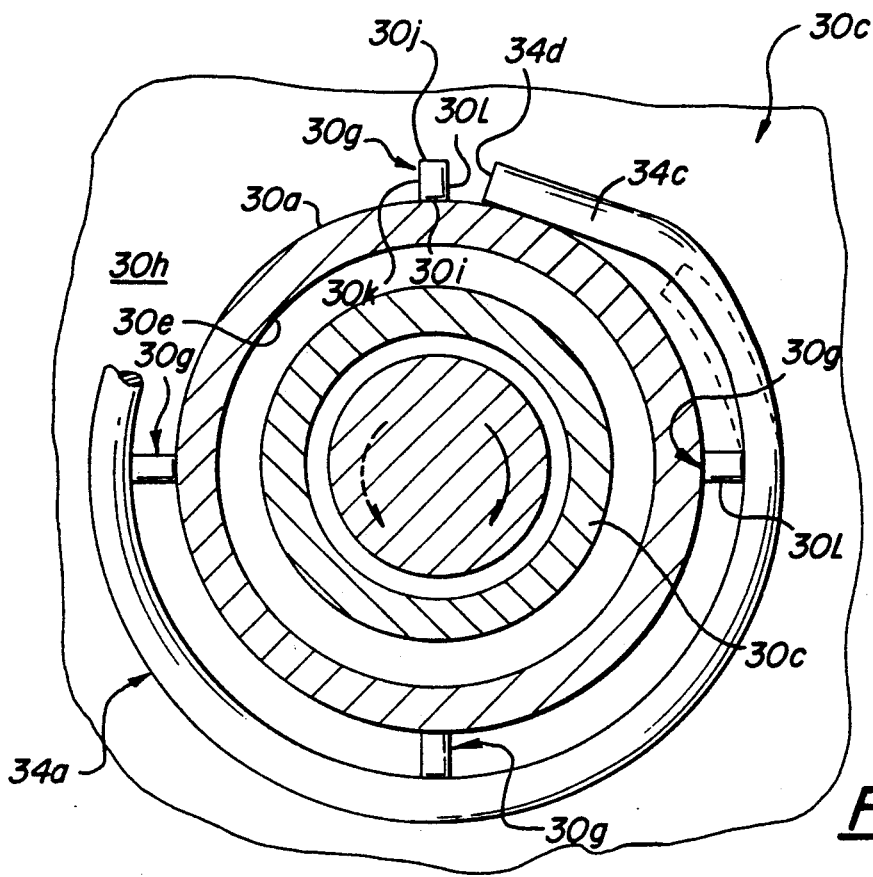
FIGS. 4 and 5 are cross-sectional views taken respectively on lines 4—4 and 5—5 of FIG. 2.
Figure 5:
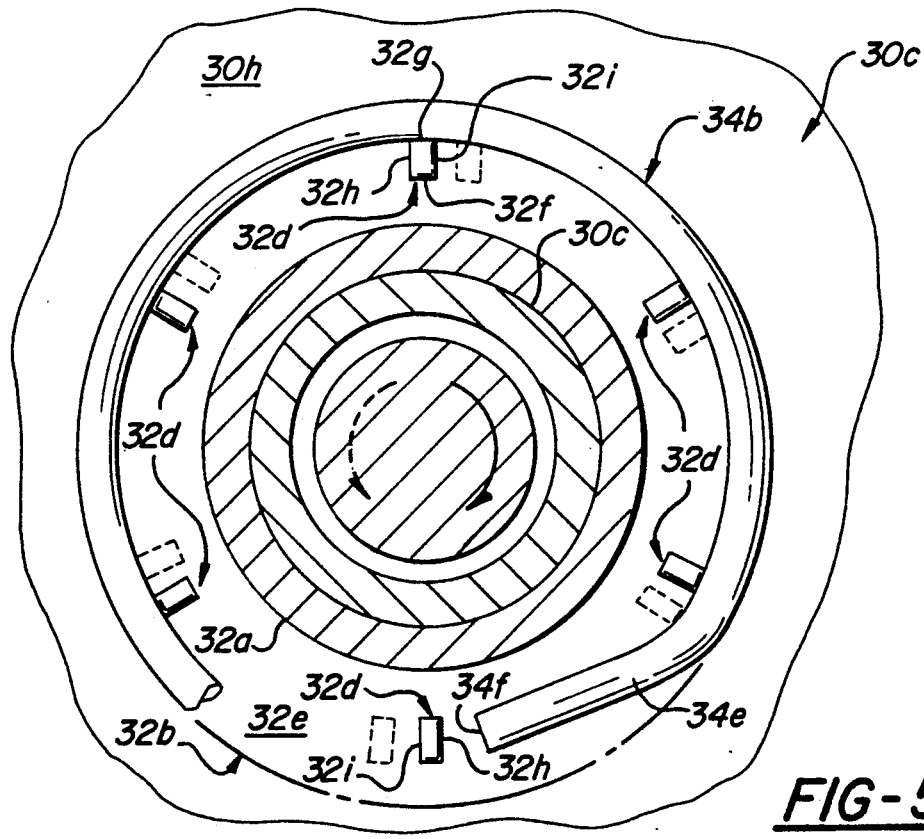

Specifically, the solid line arrow seen in FIGS. 4 and 5 indicates the direction of engine rotation and thereby of clutch shaft rotation and thereby the direction in which the release bearing 22 tends to rotate in response to the engine rotation. As the release bearing 22 tends to rotate in response to the engine rotation the piston 32 also begins to rotate in the direction of the arrow relative to the rotationally fixed cylinder 30. As the piston begins to turn or rotate relative to the cylinder the spring 34 turns with the piston with the result that the end coil 34a positioned on the lugs 30g tends to rotate clockwise as seen in FIG. 4 with respect to the fixed cylinder lugs After the spring has rotated approximately 30° relative to the cylinder, and as seen by the dash line or moved position of the end portion 34c in FIG. 4, the end portion encounters the lug 30g located at three o'clock with the result that further relative clockwise movement of the spring end coil relative to the lugs tends to bias the end portion radially outwardly. Since the spring is relatively stiff only a slight amount of relative rotation between the bent end portion and the three o'clock lug, following engagement of the bent portion with the lug, is necessary to preclude any further rotation of the spring relative to the lugs 30g whereafter, as the spring ceases its rotation, the piston continues to rotate relative to the spring and specifically relative to the end coil 32b until the lug 32d, located at four o'clock in FIG. 5, moves approximately 10° (to its dash line position) to encounter the beginning of the bent portion 34e whereafter continued relative movement between the four o'clock lug 32d and the bent portion 34e tends to bias the bent portion radially outwardly with the result that further relative rotation is precluded. In effect therefore the piston undergoes a total of approximately 40° of relative rotation or cocking movement relative to the cylinder before the spring operates to prevent any further relative rotation between the piston and the cylinder.

Conversely, if the piston and cylinder tend to rotate relative to each other in the opposite direction, that is, the direction opposite to the direction of relative rotation induced by the drive shaft rotation (and as shown by the dash line arrows of FIGS. 4 and 5) the side stop face 32h of the six o'clock lug 32d is quickly brought into engagement with the end face 34f of the bent portion 34e of the spring end coil 34b which has the effect of moving the end face 34d of the bent portion 34c of the end coil 34a quickly into abutting engagement with the side or stop face 30l of the twelve o'clock lug 30g whereby further relative rotation between the piston and cylinder in this opposite direction is precluded.

The invention actuator, and specifically the spring arrangement employed in the invention actuator, will be seen to provide a simple and inexpensive means for inhibiting relative rotation between the cylinder and piston members of the actuator in either direction of relative rotation.

Whereas a preferred embodiment of the invention has been illustrated and described in detail, it will be apparent that various changes may be made in the disclosed embodiment without departing from the scope or spirit of the invention.

What is claimed is:

1. An actuator comprising a cylinder member defining a bore having a central axis, a piston member mounted for axial movement int he bore and a spring, comprising a plurality of axially successive interconnected generally circular coils including end coils at each end of the spring each defining a free end portion, positioned in concentric surrounding relation tot he central axis and arranged to be stressed in response to relative axial movement between the cylinder member and the piston member; characterized int hat the free ned portion of at least one of the end coils of the spring is bent radially in one direction with respect to a general circle defining the end coil exclusive of the free end portion and means are provided to bias the free end portion in a radially opposite direction in response to relative rotation between the cylinder member and the piston member in one direction to impede such relative rotation.

2. An actuator according to claim 1 wherein said biasing means comprises means defining a support surface for said one end coil and including an interruption in said support surface to accommodate said bent free end portion.

3. An actuator according to claim 2 wherein the interruption includes a stop face arranged to engage the end face of the spring free end portion in response to relative rotation between the cylinder member and the piston member in the opposite direction.

4. An actuator according to claim 3 wherein said support surface is defined by a series of circumferentially spaced lugs on one of said members with the end coil engaging at least some of said lugs, said interruption is defined between one lug and the next successive lug, said stop face is defined by a side face of said one lug, and the bent end portion is positioned in said interruption so that relative rotation of the cylinder member and the piston member in said one direction brings the bent portion into engagement with said next lug to impede further relative rotation and relative rotation between the cylinder member and the piston member in said opposite direction moves said end face of the spring end portion into engagement with said side face of said one lug.

5. An actuator according to claim 1 wherein the free end portion is bent radially inwardly and biased radially outwardly in response to relative rotation of the members.

6. An actuator according to claim 4 wherein the end coil is wrapped around at least some of said lugs and the free end portion is bent radially inwardly and biased radially outwardly in response to engagement with said next lug upon relative rotation of said cylinder member and piston member in said one direction.

7. An actuator according to claim 6 wherein the free end portion of both end coils of the spring are bent radially inwardly, a series of circumferentially spaced lugs are provided on the cylinder member and on the piston member, one end coil of the spring is wrapped around at least some of the piston member lugs with its bent end portion positioned between successive piston member lugs, and the other end coil of the spring is wrapped around at least some of the cylinder member lugs with its bent end portion positioned between successive cylinder member lugs.

8. An actuator according to claim 7 wherein said cylinder member defines an annular bore and includes a radially outwardly extending flange portion, said piston member is an annular piston slidably received in said annular bore and including a free end projecting out of said annular bore and a radially outwardly extending flange portion proximate said free end confronting the cylinder member flange portion, and said lugs are provided on said flange portions.

9. A hydraulic clutch actuator comprising:
 a cylinder defining an annular bore having a central axis;
 an annular piston mounted for axial movement in said bore;
 a coil spring including end coils at each end of the spring each defining a free end portion, said spring being positioned in concentric surrounding relation to said axis and arranged to be stressed in response to relative axial movement between said cylinder and said piston with the free end portion of each end coil of the spring bent radially in one direction with respect to a circle defining the respective end coil exclusive of the free end portion; and
 means operative in response to relative rotation between the cylinder and the piston in one direction to bias said free end portions in a radially opposite direction to impede such relative rotation.

10. An actuator according to claim 9 wherein said biasing means comprises means defining support surfaces on said cylinder and on said piston for respective support of said end coils with each support surface including an interruption in the respective support surface to accommodate the bent free end portion of the respective end coil.

11. An actuator according to claim 10 wherein each interruption includes a stop face arranged to engage the end face of a respective spring end portion in response to relative rotation of said cylinder and piston in an opposite direction.

12. An actuator according to claim 11 wherein the support surfaces are defined by series of circumferentially spaced lugs on the cylinder and on the piston, respectively, with the respective end coil engaging at least some of the respective lugs, each interruption is defined between one lug of a respective series of lugs and the next successive lug, the stop face of each interruption is defined by a side face of said one lug, and the bent end portions are positioned in a respective interruption of the respective series so that relative rotation of the cylinder and piston in said one direction brings each bent portion into engagement with a respective successive lug to impede further relative rotation and relative rotation between the cylinder and the piston in said opposite direction moves said end faces of said bent end portions into engagement with respective side faces.

13. An actuator according to claim 10 wherein said free end portions are bent radially inwardly and biased radially outwardly in response to relative rotation of the members in said one direction.

14. An actuator according to claim 12 wherein each end coil is wrapped around at least some of the respective lugs and the respective free end portion is bent radially inwardly and biased radially outwardly in response to engagement with a respective successive lug upon relative rotation of the cylinder and piston in said one direction.

15. An actuator according to claim 14 wherein the piston includes a free end projecting out of the annular bore of the cylinder and includes a radially extending flange portion proximate said free end thereof, said cylinder defines a radially outwardly extending flange confronting the piston flange, and said lugs are provided on said flange portions.

* * * * *